United States Patent
Kaneko et al.

(10) Patent No.: US 6,833,887 B1
(45) Date of Patent: Dec. 21, 2004

(54) LIQUID CRYSTAL SHUTTER AND METHOD OF DRIVING THE SAME

(75) Inventors: Yasushi Kaneko, Sayama (JP); Masaaki Matsunaga, Tokyo (JP)

(73) Assignee: Citizen Watch Co., Ltd., Tokyo (JP)

( * ) Notice: Subject to any disclaimer, the term of this patent is extended or adjusted under 35 U.S.C. 154(b) by 0 days.

(21) Appl. No.: 08/981,654

(22) PCT Filed: May 9, 1997

(86) PCT No.: PCT/JP97/01564

§ 371 (c)(1),
(2), (4) Date: Jan. 8, 1998

(87) PCT Pub. No.: WO97/43685

PCT Pub. Date: Nov. 20, 1997

(30) Foreign Application Priority Data

May 10, 1996 (JP) .............................................. 8-115897

(51) Int. Cl.[7] ............................................ G02F 1/1335
(52) U.S. Cl. ........................................ 349/99; 349/101
(58) Field of Search .................................. 349/99, 101

(56) References Cited

U.S. PATENT DOCUMENTS

| | | | | |
|---|---|---|---|---|
| 3,956,169 A | * | 5/1976 | Nakano et al. ............... | 252/299 |
| 4,634,229 A | * | 1/1987 | Amstutz et al. ............. | 350/346 |
| 4,974,940 A | | 12/1990 | Asano et al. ............ | 350/347 E |
| 5,119,216 A | * | 6/1992 | Wada et al. ................... | 349/72 |
| 5,519,523 A | * | 5/1996 | Madokoro et al. ........... | 349/117 |
| 5,548,423 A | * | 8/1996 | Natsunaga ..................... | 345/94 |
| 5,699,133 A | * | 12/1997 | Furuta .......................... | 349/13 |

FOREIGN PATENT DOCUMENTS

| | | | |
|---|---|---|---|
| JP | 62-150330 | * | 7/1987 |
| JP | 1-154030 | | 6/1989 |
| JP | 1-213624 | | 8/1989 |
| JP | 2-308128 | | 12/1990 |
| JP | 6-3665 | | 1/1994 |
| JP | 6-67158 | | 3/1994 |

* cited by examiner

*Primary Examiner*—Dung T. Nguyen
(74) *Attorney, Agent, or Firm*—Westerman, Hattori, Daniels & Adrian, LLP

(57) ABSTRACT

A liquid crystal shutter comprises a liquid crystal device including a nematic liquid crystal sealed in between a first transparent substrate and a second transparent substrate on whose inner surfaces are formed respective transparent electrodes, the liquid crystal device having a twisted angle equal to or greater than 180°; and a pair of polarizing plates between which are sandwiched the first transparent substrate and the second transparent substrate, the polarizing films having respective absorption axes (13, 14) which are substantially orthogonal to each other, the absorption axes (13, 14) of the polarizing films being angled within a range of ±40° to ±50° relative to a direction (12) in which intermediate liquid crystal molecules are orientated, the direction indicating a direction of orientation of the liquid crystal in the intermediate portion in the direction of thickness of the liquid crystal device. Alternatively, Δ nd may lie within a range of 600 to 900 nm, Δ nd being the product of a birefringence Δ n of the nematic liquid crystal and a gap d between the first transparent substrate and a second transparent substrate.

2 Claims, 7 Drawing Sheets

LIQUID CRYSTAL SHUTTER AND METHOD OF DRIVING THE SAME

INDUSTRIAL FIELD

The present invention relates to a liquid crystal shutter having a fast response such as a liquid crystal optical printer or a liquid crystal optical device (which is used, for instance, in a color video printer or an LED combined field sequential color display), and to a method of driving the liquid crystal shutter.

BACKGROUND ART

Requirements for a liquid crystal shutter for use in a liquid crystal printer or a liquid crystal optical device are a rapid response, a bright display, a high contrast and a simple driving method, as well as a possible gradation display. However, a liquid crystal shutter satisfying all these requirements has not been developed so far.

The liquid crystal shutters which have hitherto been developed are roughly grouped into the following three categories by liquid crystal materials used:

(1) one using a general nematic liquid crystal;
(2) one using a nematic liquid crystal for two-frequency driving method having a positive or negative dielectric constant depending on the frequencies; and
(3) one using a ferroelectric liquid crystal having a spontaneous polarization.

The liquid crystal shutter using the two-frequency driving method mentioned above (2) has a rapid response but has a complicated driving circuit due to its high driving voltage and high driving frequency.

The liquid crystal shutter using the ferroelectric liquid crystal of (3) above operates faster than that using the two-frequency driving liquid crystal, that is, with a response time of several tens of $\mu s$, but is deficient in the stability of orientation due to use of a smectic liquid crystal phase. It also brings about a sticking phenomenon in which a display pattern remains fixed due to the DC drive and entails in principle a difficulty with the gradation control, which prevent it from being put to practical use except in certain specific applications.

The liquid crystal shutter using the general nematic liquid crystal mentioned above (1) employs the following systems depending on the principle of operation:

(a) a so-called TN (twisted nematic) liquid crystal system in which a white or black display is performed by utilizing a phenomenon called rotary polarization, rotating the incident light, in which a black or white display is performed by applying a voltage to pixels so as to orientate the liquid crystal molecules substantially orthogonal to the substrates to thereby eliminate the rotary polarization; and
(b) a so-called STN (super twisted nematic) liquid crystal system in which a white or black display is performed by utilizing birefringence causing a phase difference in the incident light, in which a black or white display is performed by applying a voltage to the display pixels to thereby vary the birefringence.

An example of the liquid crystal system of (a) above is found in Japanese Patent Laid-open Pub. No. Sho62-150330.

Reference is made to FIGS. 10 and 11 to explain this. FIG. 11 is a schematic sectional view of the conventional TN liquid crystal shutter, and FIG. 10 is a top plan view showing a relationship between absorption axes of polarizing plates and the direction in which liquid crystal molecules are orientated, obtained when a liquid crystal shutter shown in FIG. 11 is viewed from the upper polarizing plate side.

As illustrated in FIG. 11, the liquid crystal device comprises a first transparent substrate 1 on which are formed a transparent first electrode 2 made of indium tin oxide (ITO) and an orientation film 3, a second transparent substrate 4 on which are formed a transparent second electrode 5 made of ITO and an orientation film 6, and a nematic liquid crystal 7 sealed in between the first and second substrates. On the top and bottom of the liquid crystal device there are arranged an upper polarizing plate 9 and a lower polarizing plate 8, respectively, in such a manner that their respective absorption axes are orthogonal to each other, to thereby constitute the TN liquid crystal shutter.

As shown in FIG. 10, in this case, the liquid crystal device has a twisted angle of 90°, with the absorption axis 13 of the lower polarizing plate 8 being parallel to the direction 10 in which lower liquid crystal molecules are orientated, that is, the direction of orientation of molecules closer to the first transparent substrate 1, and with the absorption axis 14 of the upper polarizing plate 9 being parallel to the direction 11 in which upper liquid crystal molecules are orientated, that is, the direction of orientation of the liquid crystal closer to the second transparent substrate 4.

With no voltage applied, in this TN liquid crystal shutter, linearly polarized light transmitted through the lower polarizing plate 8 is rotated by 90° due to the rotary polarization of the liquid crystal and exits the upper-polarizing plate 9, resulting in an opened state allowing a so-called positive display. When a 15V voltage is applied at a 5 kHz driving frequency between the first electrode 2 and the second electrode 5, the molecules of the nematic liquid crystal are orientated in the direction orthogonal to the transparent substrates 1 and 4 to nullify the rotary polarization, thus allowing the linearly polarized light transmitted through the lower polarizing plate 8 to advance intactly through the interior of the liquid crystal device without any rotation and to be blocked by the upper polarizing plate 9, resulting in a closed state.

An example employing method (b) above includes an STN liquid crystal display called a yellow mode for use in general liquid crystal displays. A conventional example thereof will be described with reference to FIGS. 12 and 13.

FIG. 13 is a schematic sectional view of a conventional STN liquid crystal display, and FIG. 12 is a top plan view showing a relationship between the absorption axes of the polarizing films and the direction in which the liquid crystal molecules are orientated, obtained when FIG. 13 is viewed from the upper polarizing plate side.

The configuration of the liquid crystal device shown in FIG. 13 is similar to the configuration of the liquid crystal device shown in FIG. 11, and hence identical parts to those of FIG. 11 are designated by the same reference numerals and are not again described.

On the top and bottom of the liquid crystal device having the nematic liquid crystal 7 sealed in between the first and second transparent substrates 1 and 4 there are arranged the upper polarizing plate 9 and the lower polarizing plate 8 in such a manner that their respective absorption axes intersect at 60° relative to each other, thereby constituting an STN liquid crystal display.

As shown in FIG. 12, in this case, the liquid crystal device has a twisted angle of 240°, with the absorption axis 13 of the lower polarizing plate 8 being angled at 45° relative to the direction 10 in which the lower liquid crystal molecules are orientated, that is, the direction of orientation of the liquid crystal closer to the first transparent substrate 1, and with the absorption axis 14 of the upper polarizing plate 9 being angled at 45° relative to the direction 11 in which the upper liquid crystal molecules are orientated, that is, the direction of orientation of the liquid crystal closer to the second transparent substrate 4.

Thus, relative to the direction 12 in which the intermediate liquid crystal molecules are orientated, that is, the direction of orientation of the liquid crystal molecules intermediate between the first transparent substrate 1 and the second transparent substrate 4, the absorption axis 13 of the lower polarizing plate 8 forms an angle of 75° with the absorption axis 14 of the upper polarizing plate 9 forming an angle of 15°.

With no voltage applied, in this STN liquid crystal display, linearly polarized light incident at 45° relative to the liquid crystal molecules through the lower polarizing plate 8 is turned into elliptically polarized light due to the birefringence of the nematic liquid crystal 7, which in turn exits the upper polarizing plate 9, resulting in an opened state allowing a yellowish white color display, that is, a so-called positive display. When a 3 to 5V voltage is applied at a 1 to 5 kHz frequency between the first electrode 2 and the second electrode 5, the molecules of the nematic liquid crystal 7 are orientated in the direction orthogonal to the transparent substrates 1 and 4 to reduce its birefringence, thus allowing the linearly polarized light incident through the lower polarizing plate 8 to undergo a varied state of elliptical polarization, and in turn exits the upper polarizing plate 9 in a bluish black display in the closed state.

In the case of system (a) above, however, the response time taken to return to the opened state by the removal of voltage from the closed state is as long as ten to several tens of ms although the response time taken to reach the closed state by the applying of voltage from the opened state is as short as several ms. Hence, when using it as the liquid crystal shutter for optical printers, the frame term must be increased corresponding to a write term in which opening and closing are repeated, resulting in an increased write time and a reduced print speed. It is also impossible to apply it to a high-speed liquid crystal optical device required to have a frame term of several ms.

Furthermore, the above publication teaches that the liquid crystal device having a 270° or 450° twist other than a 90° twist is more preferred due to a reduction in the response time taken to recover the open state.

Although it is certain that the 270° twist is shorter in response time than the 90° twist, a specific orientation film, such as SiO orthorhombic deposited film, ensuring that a high pre-tilt must be used with a concurrent difficulty of obtaining satisfactory stability in orientation, which is not practical.

In the case of system (b) above, the liquid crystal device can be a practical so-called STN liquid crystal device having a 225° to 250° twist, thereby reducing the response time from the closed state to the opened state to several ms. As a result of application of voltage to the liquid crystal device, however, the closed state presents a bluish black color and hence the contrast is as low as about 10. In addition, when the applied voltage is further raised, the state of the elliptically polarized light becomes changed, again allowing a brightening, so that the applied voltage cannot be set so high. It results in that the response time from the opened state to the closed state is increased to ten to several tens of ms, making it difficult to use it as a liquid crystal shutter.

It is therefore the object of the present invention to provide a liquid crystal shutter ensuring a rapid response and a high contrast as well as a liquid crystal shutter driving method capable of a gradation display.

DISCLOSURE OF THE INVENTION

In order to achieve the above object, a liquid crystal shutter in accordance with the present invention comprises: a liquid crystal device including a nematic liquid crystal sealed in between a first transparent substrate and a second transparent substrate on whose inner surfaces are formed respective transparent electrodes, the liquid crystal device having a twisted angle equal to or greater than 180°; and a pair of polarizing plates between which are sandwiched the first transparent substrate and the second transparent substrate, the polarizing films having respective absorption axes which are substantially orthogonal to each other, the absorption axes of the polarizing films being angled within a range of ±40° to ±50° relative to a direction in which intermediate liquid crystal molecules are orientated, the direction indicating a direction of orientation of the liquid crystal in an intermediate portion in a direction of thickness of the liquid crystal device.

Alternatively, when absorption axes of the polarizing films are substantially orthogonal to each other, $\Delta$ nd may lie within a range of 600 to 900 nm, the $\Delta$ nd being the product of a birefringence $\Delta$ n of the nematic liquid crystal and a gap d between the first transparent substrate and the second transparent substrate.

More preferably, the polarizing films have respective absorption axes which are substantially orthogonal to each other, the absorption axes of the polarizing films being angled within a range of ±40° to ±50° relative to a direction in which intermediate liquid crystal molecules are orientated, the direction indicating a direction of orientation of the liquid crystal in the intermediate portion in the direction of thickness of the liquid crystal device, $\Delta$ nd lying within a range of 600 to 900 nm, the $\Delta$ nd being the product of a birefringence $\Delta$ n of the nematic liquid crystal and a gap d between the first transparent substrate and the second transparent substrate.

In a method of driving a liquid crystal shutter in accordance with the present invention, a single drive term of the liquid crystal shutter is divided into a reset term during which all pixels of the liquid crystal shutter are rendered closed and a scan term during which all the pixels or predetermined pixels are rendered opened or half-opened; the duration of the scan term being made shorter than a holding time taken for a transmittance of the liquid crystal shutter to start to lower after it has reached its maximum with no driving voltage applied to the liquid crystal shutter.

A positive or negative driving voltage can be applied to the liquid crystal shutter during a partial period within the scan term, the driving voltage being set to 0V during the remaining period, the period during which the driving voltage is set to 0V being varied to perform a gradation display.

The voltage applied to the liquid crystal shutter in the scan term may be varied from 0V to perform a gradation display.

Preferably, a single driving term of the liquid crystal shutter is controlled, depending on the operating temperature, so as to be increased at the time of a low temperature but reduced at the time of a high temperature.

A single driving term of the liquid crystal shutter may be assigned exclusively to a scan term during which all pixels or predetermined pixels of the liquid crystal shutter are rendered opened or half-opened, the scan term being controlled, depending on the operating temperature, so as to be lengthened at the time of a low temperature but shortened at the time of a high temperature.

BEST MODE FOR CARRYING OUT THE INVENTION

Figure 1:
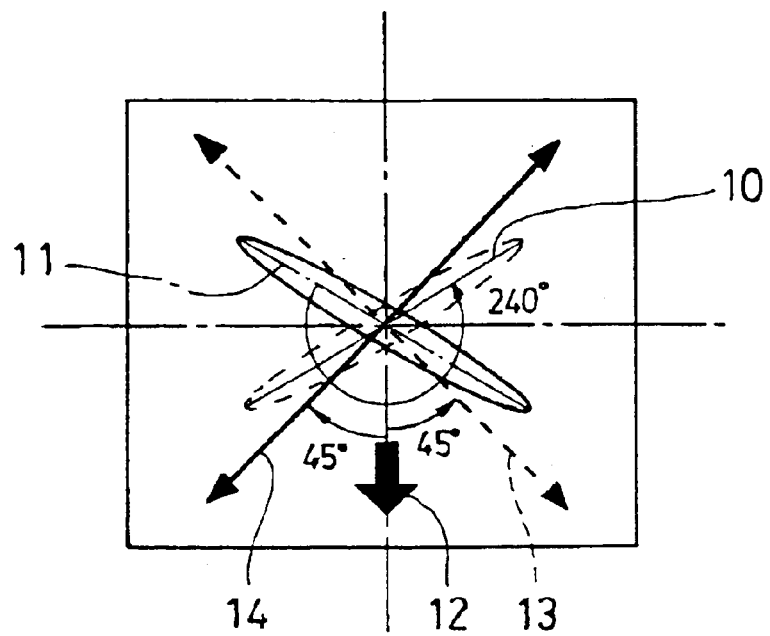
FIG. 1 is a top plan view showing a relationship between absorption axes of polarizing plates and the direction in which liquid crystal molecules are orientated, obtained when a liquid crystal shutter shown in FIG. 2 is viewed from its upper polarizing plate side.
Figure 2:
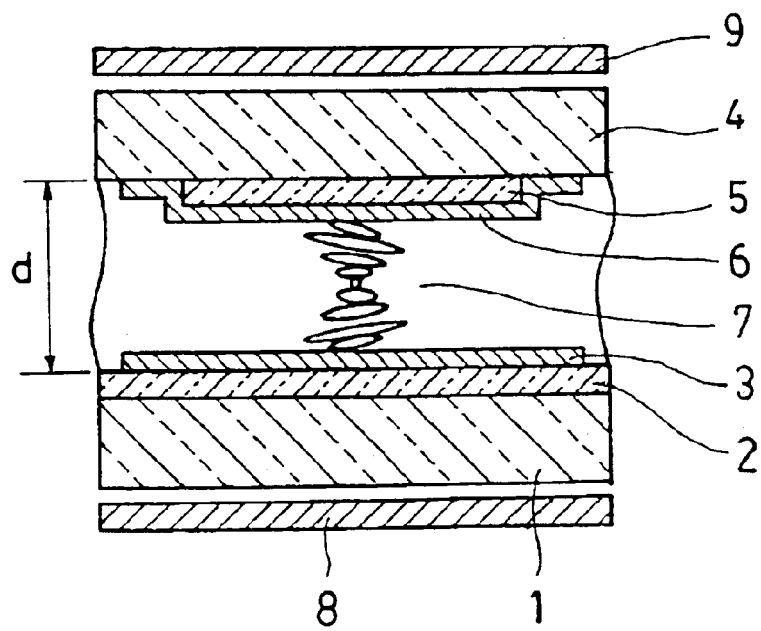
FIG. 2 is a schematic sectional view of the liquid crystal shutter which is an embodiment of the present invention.

In order to describe the present invention in more detail, a most preferred embodiment of the invention will now be described with reference to the accompanying drawings.
Liquid Crystal Shutter in Accordance With the Present Invention FIG. 2 is a schematic sectional view showing a structure of a liquid crystal shutter which is an embodiment of the present invention, and FIG. 1 is a top plan view showing a relationship between absorption axes of polarizing plates and directions in which liquid crystal molecules are orientated, when the liquid crystal shutter of FIG. 2 is viewed from the upper polarizing plate side. In these diagrams, parts corresponding to those of FIGS. 10 to 13 illustrating the above conventional examples are designated by the same reference numerals.

Referring first to FIG. 2, this liquid crystal shutter comprises a first transparent substrate 1 made of 0.7 mm-thick glass on which are formed a first transparent electrode 2 made of ITO and an orientation film 3; and a second transparent substrate 4 made of 0.7 mm-thick glass on which are formed a second electrode 5 made of ITO and an orientation film 6, with a nematic liquid crystal 7 being sealed in between the first and second substrates to constitute a liquid crystal device. The birefringence $\Delta$ n of the nematic liquid crystal used in this shutter is 0.2, the gap d between the first transparent substrate 1 and the second transparent substrate 4 is 4 $\mu$m, and the value of $\Delta$ nd indicating a birefringence as a liquid crystal device is set at 800 nm.

The orientation film 3 above the first transparent substrate 1 is previously subjected to a rubbing treatment in the direction 10 in which lower liquid crystal molecules are orientated as illustrated in FIG. 1. The orientation film 6 above the second transparent substrate 4 is previously subjected to the rubbing treatment in the direction 11 in which upper liquid crystal molecules are orientated as illustrated in FIG. 1. To twist liquid crystal molecules, a chiral material is added to the nematic liquid crystal 7 having a viscosity of 18 cp, allowing its natural twist pitch to be 8 $\mu$m, to thereby form a leftward 240° twisted liquid crystal device.

On the top and bottom of the liquid crystal device there are arranged an upper polarizing plate 9 and a lower polarizing plate 8, respectively, in such a manner that their respective absorption axes 14 and 13 are orthogonal to each other.

At that time, the absorption axis 13 of the lower polarizing plate 8 is angled at 45° counterclockwise relative to the direction 12 in which intermediate liquid crystal molecules are orientated, the direction 12 indicating the direction of orientation of the intermediate portion of the nematic liquid crystal 7 between the first transparent substrate 1 and the second transparent substrate 4, whereas the absorption axis 14 of the upper polarizing plate 9 is angled at 45° clockwise relative to the direction 12 in which the intermediate liquid crystal molecules are orientated, thus constituting a positive liquid crystal shutter.

In the state where no voltage is applied to this liquid crystal shutter, linearly polarized light that has passed through the lower polarizing plate 8 is turned by the birefringence of the liquid crystal into an elliptically polarized light, which is then allowed to exit the upper polarizing plate 9 to form a slightly yellowed white display at an opened state, or a so-called positive display.

When a DC or AC voltage of 10 to 20V is applied between the first electrode 2 and the second electrode 5, the molecules of the nematic liquid crystal 7 are orientated in the direction orthogonal to the transparent substrates 1 and 4 so that the birefringence is nullified, allowing linearly polarized light which has passed through the lower polarizing plate 8 to travel intactly through the interior of the liquid crystal device to be blocked by the upper polarizing plate 9, thus forming a black display at a closed state.

Characteristics of the Above Liquid Crystal Shutter

Figure 3:
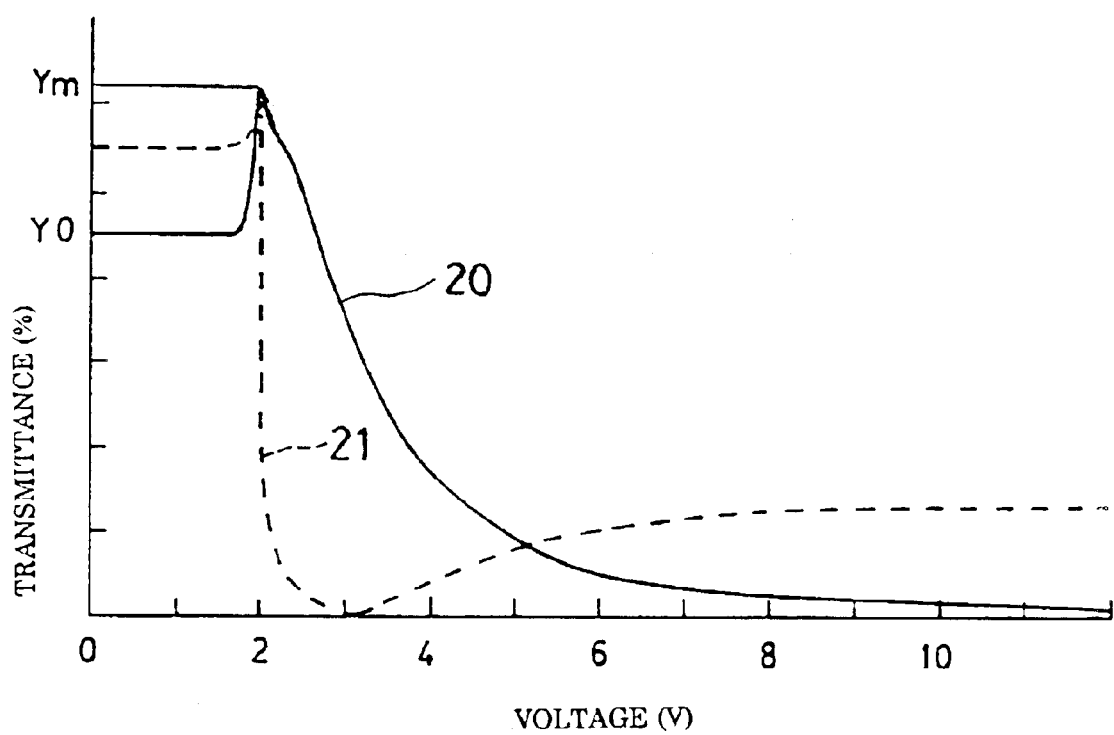
FIG. 3 illustrates for comparison purposes transmittance-voltage curves showing variance of the transmittance relative to applied voltage, of the liquid crystal shutter in accordance with the present invention and of the conventional liquid crystal shutter.
Figure 4:
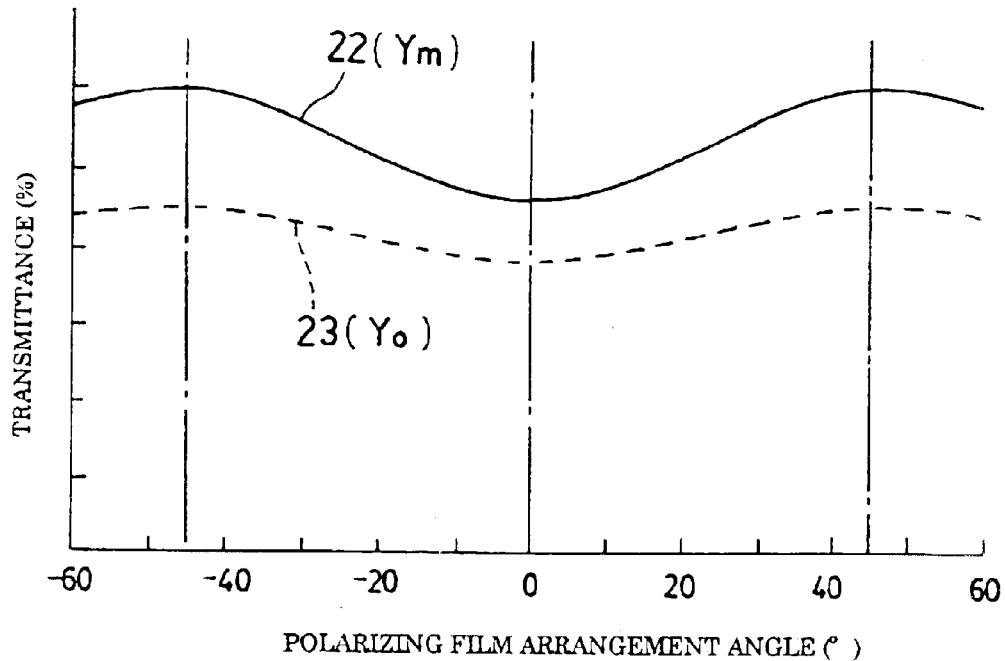
FIG. 4 is a diagram showing a relationship between the arrangement angle of the polarizing plate and the transmittance in the liquid crystal shutter in accordance with the present invention.
Figure 5:
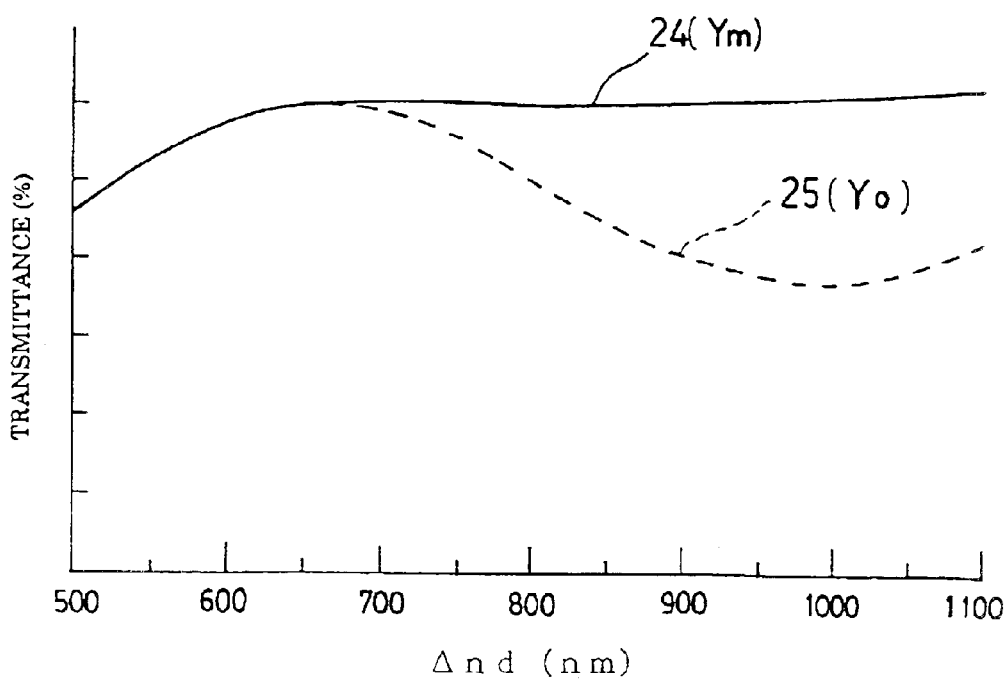
FIG. 5 is a diagram showing a relationship between $\Delta$ nd of the liquid crystal device and the transmittance in the liquid crystal shutter in accordance with the present invention.

Reference is now made to FIGS. 3 to 5 to describe the characteristics of this liquid crystal shutter.

A solid line 20 in FIG. 3 represents a transmittance-voltage curve of the liquid crystal shutter set forth hereinabove (a broken line 21 represents a conventional one). Starting from the initial transmittance Y0 with no voltage applied, the transmittance gradually rises accordingly as more voltage is applied between the first and second electrodes 2 and 5, and reaches a maximum transmittance Ym in the vicinity of an applied voltage of 2V. When the applied voltage is further increased, the transmittance lowers. The transmittance at an applied voltage of 10V becomes about a fiftieth of the initial transmittance Y0, with a contrast ratio on the order of 50. Application of a voltage higher than 20V results in the acquisition of a contrast ratio of more than 100.

Since the opened state allowing the white display with no voltage applied is presented by making use of the birefringence of the liquid crystal device as described above, the arrangement of the polarizing films 8 and 9 and the setting of Δ nd indicative of the birefringence of the liquid crystal device are essential, which affect the brightness and the colored state to a large extent.

FIG. 4 shows arrangement angles of the lower polarizing plate 8 and the transmittance of the liquid crystal shutter, obtained when the lower polarizing plate 8 is rotated counterclockwise from the direction 12 in which the intermediate liquid crystal molecules are orientated, with the intersection angle fixed at 90° between the absorption axis 13 of the lower polarizing plate 8 and the absorption axis 14 of the upper polarizing plate 9 in a 240° twisted liquid crystal device having a value of Δ nd equal to 800 nm.

A solid line 22 represents a relationship between the maximum transmittance Ym and the arrangement angle of the polarizing plate, while a broken line 23 represents a relationship between the initial transmittance Y0, with no voltage applied, and the arrangement angle of the polarizing plate.

At ~60°, the direction 10 in which the lower liquid crystal molecules are orientated becomes parallel to the absorption axis 13 of the lower polarizing plate 8. It is most advantageous at −45° and +45° in that both Y0 and Ym present their respective local maximum values with less colored conditions.

FIG. 5 shows Δ nd of the 240° twisted liquid crystal device and the transmittance of the liquid crystal shutter, obtained when the absorption axis 13 of the lower polarizing plate 8 is positioned at 45° counterclockwise from the direction 12 in which the intermediate liquid crystal molecules are orientated, with an intersection angle of 90° between the absorption axis 13 of the lower polarizing plate 8 and the absorption axis 14 of the upper polarizing plate 9.

A solid line 24 represents the maximum transmittance Ym and a broken line 25 represents the initial transmittance Y0 at the time of no applied voltage. At Δ nd=650 nm, the maximum transmittance Ym reaches its maximum and thereafter remains substantially unvaried even though Δ nd further increases, whereas the initial transmittance Y0 with no applied voltage gradually lowers, so that it is not preferred for Δ nd to become too large. On the contrary, when Δ nd is smaller than 650 nm, the maximum transmittance Ym also decreases, with the result that a preferred value of Δ nd lies within a range of 600 nm to 900 nm, and particularly 700 nm to 800 nm.

Although it may vary more or less depending on the twisted angle, the optimum value of Δ nd lies within a range of about 600 nm to 900 nm, in the case of a twisted angle of 180° to 260°.

In this embodiment, Δ nd is set at 800 nm with the twisted angle of 240°, so that the opened state ensuring a bright and relatively less colored white display is achieved with a contrast of more than 100 upon the application of a drive voltage of 20V.

Method of Driving the Liquid Crystal Shutter

Description will next be made of a method of driving the liquid crystal shutter set forth hereinabove.

Figure 6:
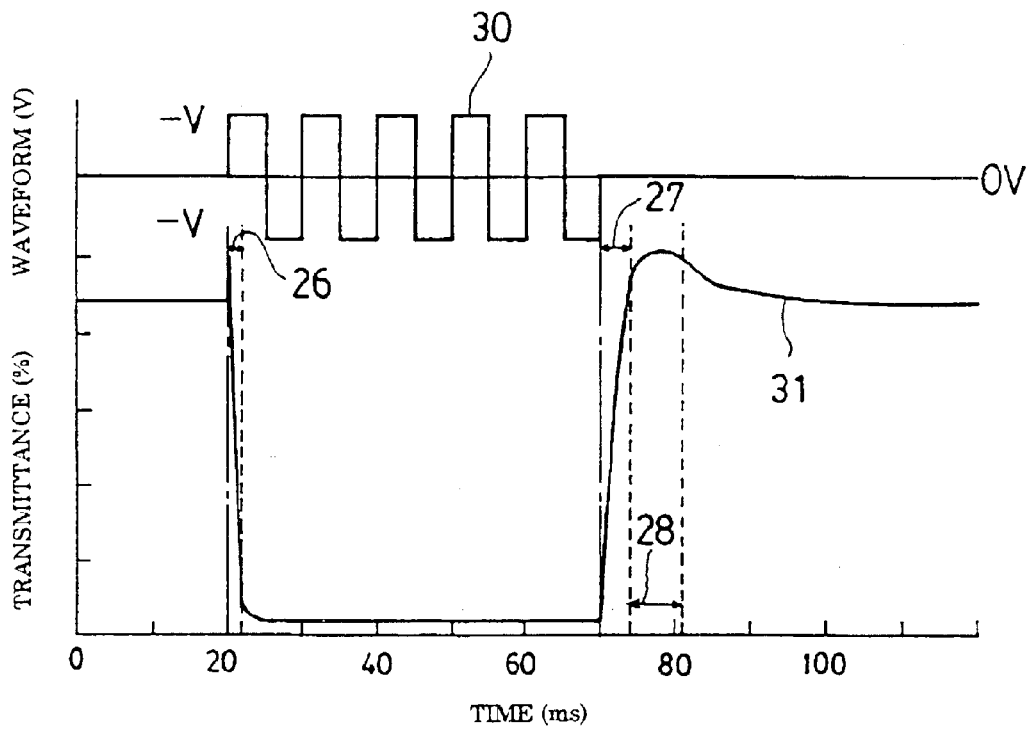
FIG. 6 is a diagram showing a driving waveform and a transmittance-time curve for the purpose of explaining a fundamental method of driving the liquid crystal shutter in accordance with the present invention.

FIG. 6 is a diagram depicting a driving waveform 30 and a transmittance-time curve 31 representative of the variance with time of the transmittance, obtained when a 100 Hz, 20V AC signal is applied for 50 ms between the first and second electrodes 2 and 5 of the liquid crystal shutter shown in FIGS. 1 and 2.

When the AC signal is applied under the opened state (white display) at no applied voltage, as can be seen from this diagram, the transmittance instantaneously rises and thereafter sharply drops resulting in the closed state (black display). An on-response time 26 at that time is influenced by the applied voltage so that accordingly as a higher voltage is applied to the liquid crystal shutter, the on-response time 26 decreases. In this embodiment, the liquid crystal shutter is subjected to a high voltage of 20V, thus achieving a very rapid on-response time 26 of less than one ms.

On the contrary, when the AC signal is returned to 0V under the closed state, the transmittance reaches its maximum in about two ms and recovers its initial value after an elapse of about 20 ms. Due to the utilization of a resilient force untwisting the liquid crystal twist, an off-response time for returning from the closed state to the opened state decreases accordingly as the twisted angle of the liquid crystal device increases. The proper definition of the response time for the liquid crystal device is the time taken for the variance of the liquid crystal molecules to become stabilized. Hence, in FIG. 6, the response time is 20 ms. In the case of being used as the liquid crystal shutter, however, the time taken to return to the opened state allowing the white display is effective as the response time. Thus, the off-response time 27 of the 240° twisted liquid crystal shutter in accordance with the present invention is 2 ms, achieving a rapid response liquid crystal shutter.

Until the maximum transmittance in the opened state is exhibited after the black display in the closed state, there is provided a relatively less colored and bluish white display. After the elapse of about 10 ms of a holding time 28 during which its maximum transmittance is kept, the transmittance lowers with the white display yellowed to some extent. In order to execute a gradation display, therefore, a reset signal is issued within the holding time 28 during which the liquid crystal shutter exhibits its maximum transmittance, to restore the closed state. Thus, by utilizing the less colored state between the closed state and the maximum transmittance, a satisfactory gradation display is achieved.

Figure 7:
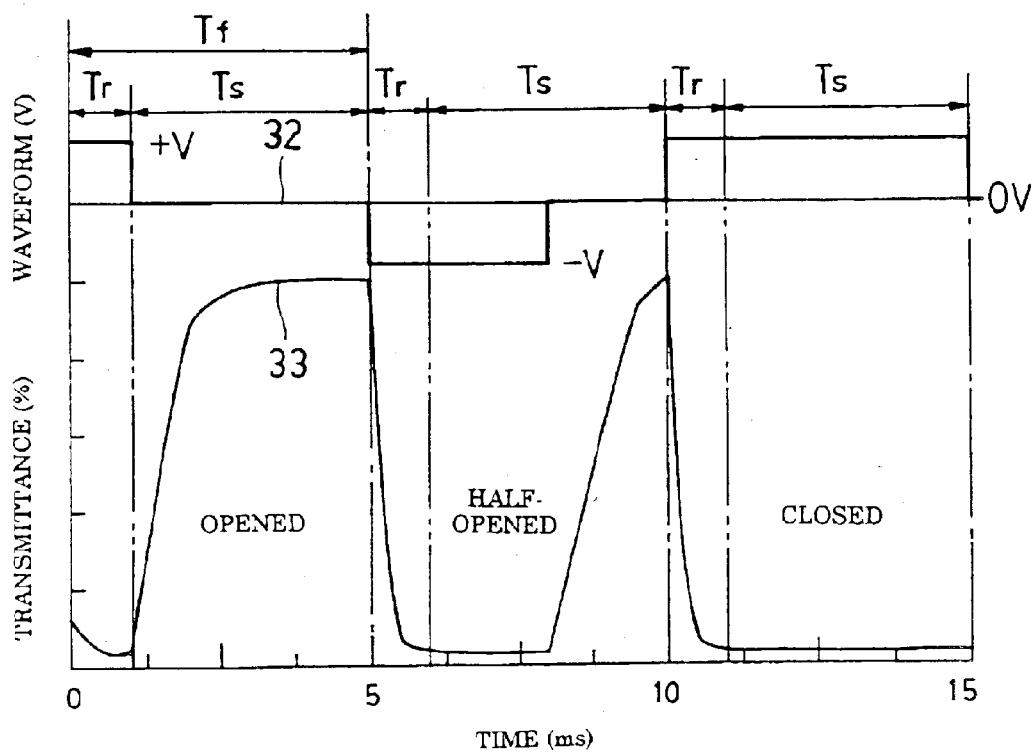
FIG. 7 is a diagram showing a driving waveform and a transmittance-time curve of the liquid crystal shutter in accordance with the present invention, obtained when the liquid crystal shutter is applied to a color video liquid crystal printer.

FIG. 7 shows a driving waveform 32 and a transmittance-time curve 33, obtained when the liquid crystal shutter in accordance with the present invention is applied to a color video liquid crystal printer.

In FIG. 7, Tf represents a frame term corresponding to a single write term, which consists of a reset term Tr and a scan term Ts. The reset term Tr is set to be 1 ms which is longer than the on-response time 26 shown in FIG. 6 and the scan term Ts is set to be 4 ms which is shorter than the 10 ms of the holding time 28.

A first frame at the left-hand end of FIG. 7 indicates a fully-opened state, a second frame in the middle indicates a half-opened state and a third frame at the right-hand end indicates a closed state.

In the reset term Tr, to render all pixels of the liquid crystal shutter closed, a 20V DC signal is applied as a reset signal to all the pixels.

In the case of rendering the liquid crystal shutter fully opened in the scan term Ts, a 0V data signal is applied over the entire duration of the scan term Ts. In the scan term Ts as well, when keeping the liquid crystal shutter closed, a 20V data signal is applied over the entire duration of the scan term Ts. In the case of making the liquid crystal shutter half-closed to present halftones in the scan term Ts, a 0V data signal is applied for 2 ms equal to half of the scan term Ts and a 20V data signal is applied for the remaining 2 ms.

By inverting polarities of the reset signal and data signal from frame to frame, long-term DC voltage application to the liquid crystal device is suppressed. After the return of all the pixels of the liquid crystal shutter to their respective closed states in the reset term Tr, a period of time during which a 0V data signal is applied can be varied in the scan term Ts so that only a predetermined pixel is opened or closed and an arbitrary gradation display is obtained.

The scan term Ts is set at 4 ms, which is longer than the 2 ms of the off-response time 27 taken to reach the maximum transmittance Ym after the closed state shown in FIG. 6 and is shorter than the 10 ms of the holding time 28 taken to start to return to the initial transmittance Y0 from the maximum transmittance Ym, so that it is possible to obtain a gradation display subjected to less variation in color and having a good linearity, thus achieving the acquisition of a high-quality full color image print.

Although this embodiment employs the 240° twisted liquid crystal device, any other liquid crystal device having a twist of more than 180° is also applicable to obtain similar effects.

It is sufficient if the absorption axes of the upper and lower polarizing plates 9 and 8 intersect at approximately 90° and that the arrangement angles of the polarizing films lie within a range of 40° to 50° relative to the direction in which the intermediate liquid crystal molecules are orientated.

Alternatively, the intersecting angle of the absorption axes of the upper and lower polarizing plates 9 and 8 may be reduced to 80° to 85° to further improve the coloring at the time of no applied voltage.

Although in this embodiment the absorption axes of the polarizing films are angled at ±45° relative to the direction in which the intermediate liquid crystal molecules are orientated and Δ nd of the liquid crystal device is set at 800 nm, a certain effect is achieved merely by employing the ±45° arrangement of the polarizing films or by setting Δ nd of the liquid crystal device to 600 to 900 nm.

Although in this embodiment such a description has been made that the gradation control is performed by varying the period of time during which the 0V scan signal is issued in the scan term Ts, the gradation control may be carried out by changing the voltage applied in the scan term from 0V so as to increase the off-response time.

Another embodiment of a method of driving the liquid crystal shutter in accordance with the present invention will now be described with reference to FIGS. 8 and 9.

Figure 8:
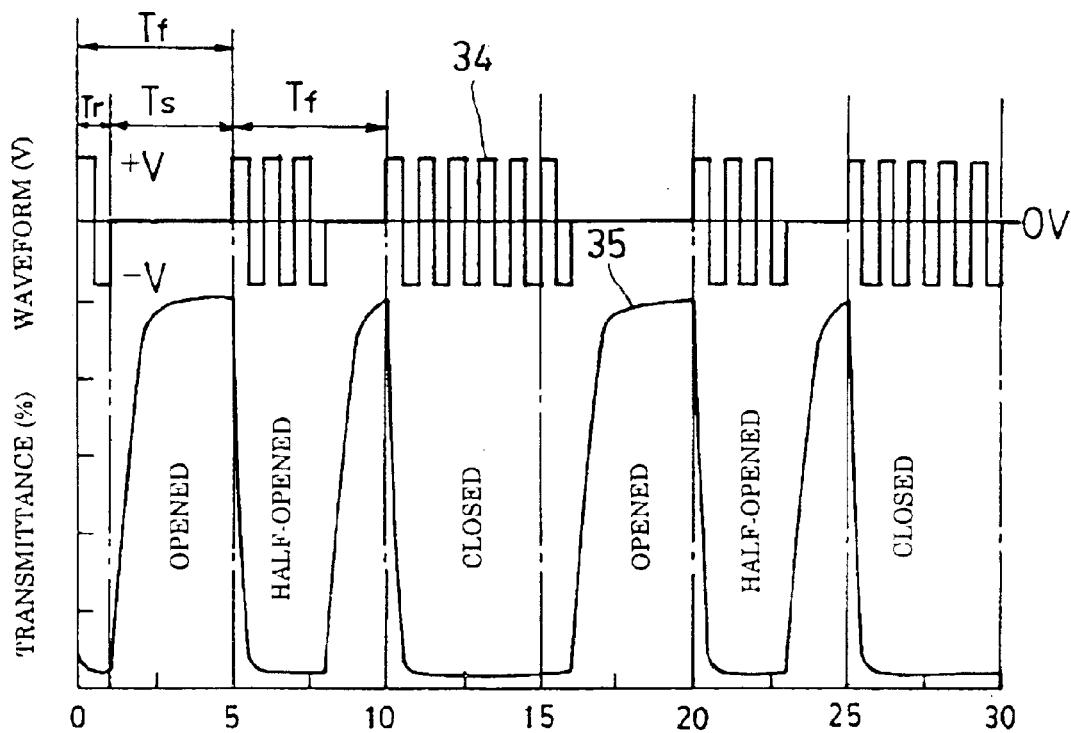
FIG. 8 is also a diagram showing a driving waveform and a transmittance-time curve of the liquid crystal shutter at room temperature, for the purpose of explaining another driving method.
Figure 9:
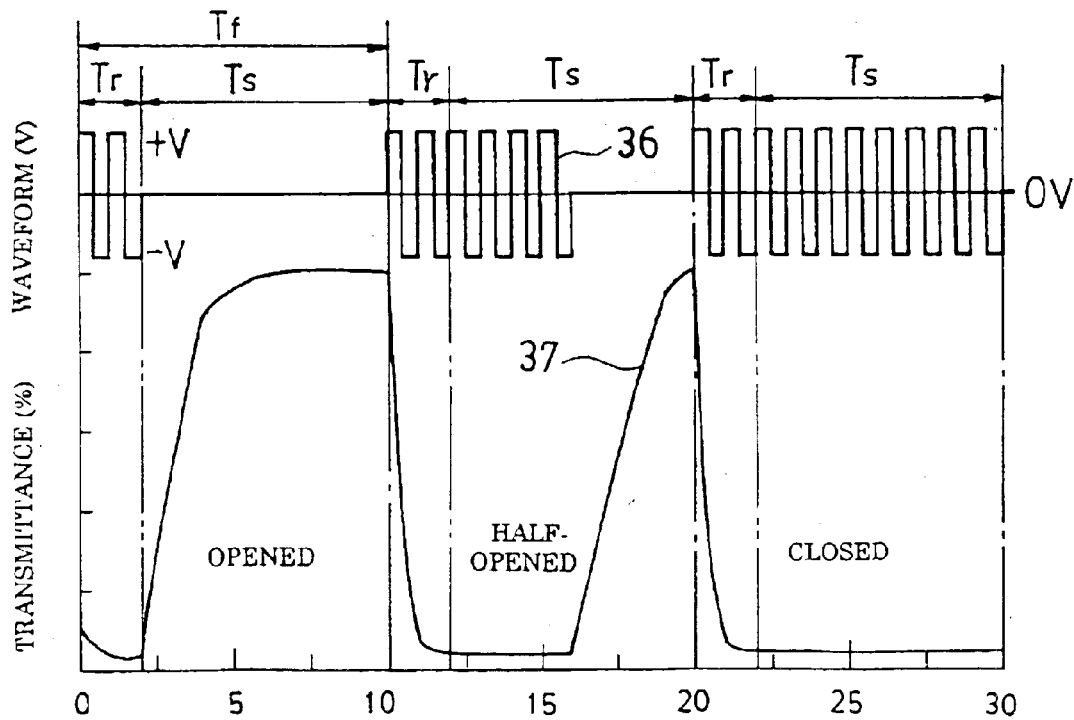
FIG. 9 is also a diagram showing a driving waveform and a transmittance-time curve of the liquid crystal shutter at a lower temperature.
Figure 10:
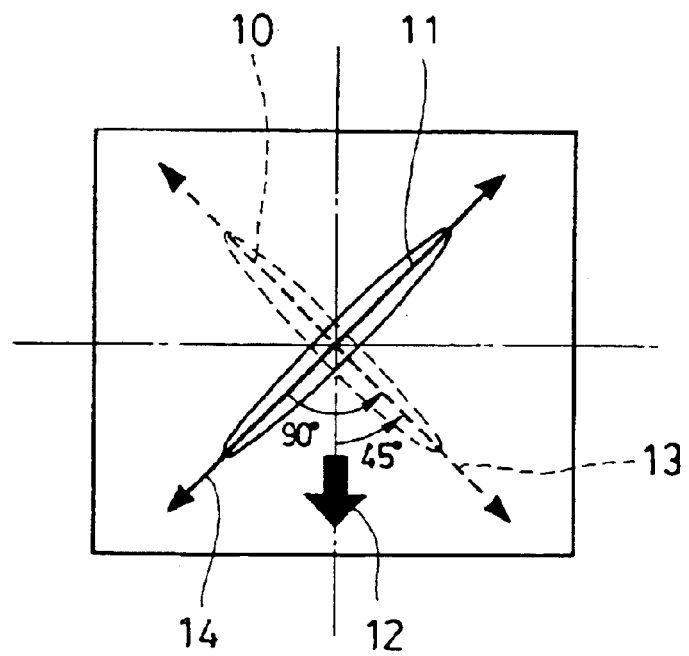
FIG. 10 is a top plan view showing a relationship between absorption axes of polarizing plates and the direction in which liquid crystal molecules are orientated, obtained when a conventional liquid crystal shutter shown in FIG. 11 is viewed from its upper polarizing plate side.
Figure 11:
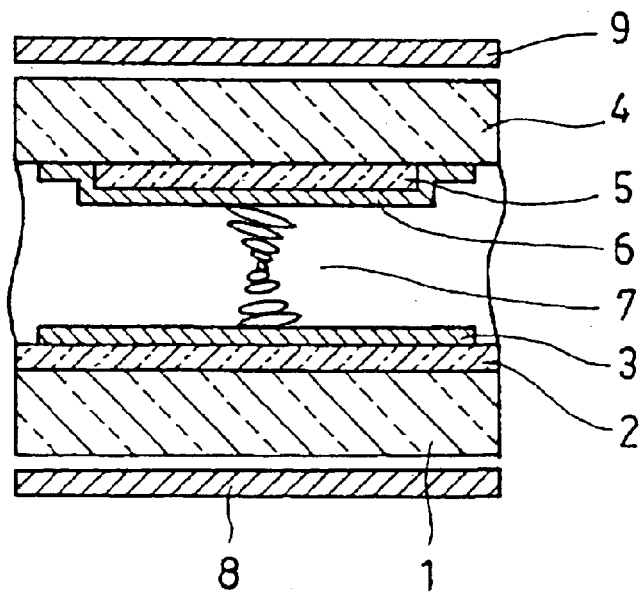
FIG. 11 is a schematic sectional view showing by way of example a conventional liquid crystal shutter.
Figure 12:
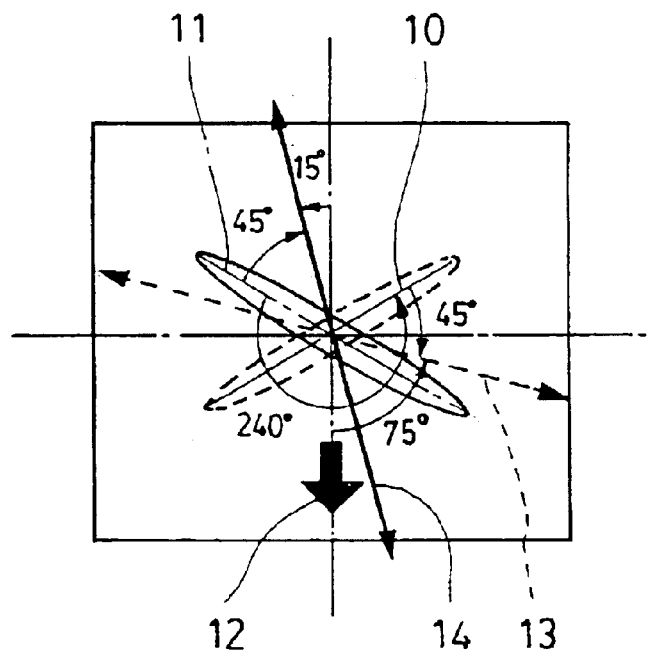
FIG. 12 is a top plan view showing a relationship between absorption axes of polarizing plates and the direction in which liquid crystal molecules are orientated, obtained when a conventional STN liquid crystal display shown in FIG. 13 is viewed from its upper polarizing plate side.
Figure 13:
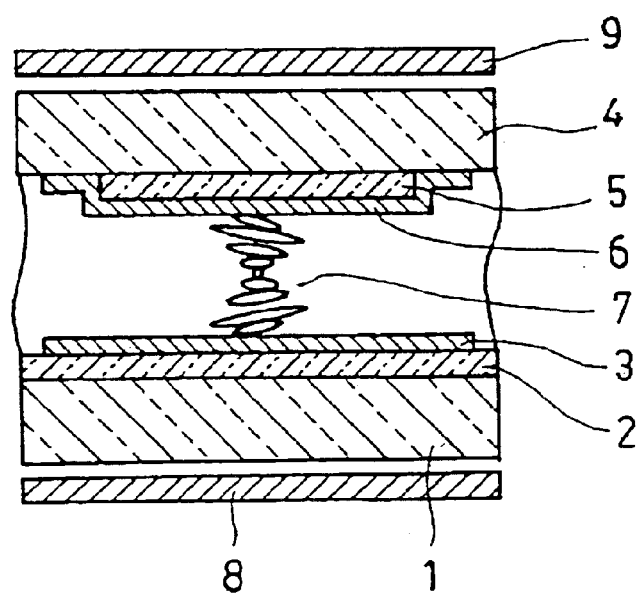
FIG. 13 is a schematic sectional view showing an example of the conventional STN liquid crystal display.

FIG. 8 is a diagram depicting a driving waveform 34 and a transmittance-time curve 35 at room temperature, obtained when the liquid crystal shutter of the present invention is applied to a color video liquid crystal printer, and FIG. 9 is a diagram depicting a driving waveform 36 and a transmittance-time curve 37 at 0° C.

In FIG. 8, the reset term Tr at room temperature (approx. 25° C.) is set at 1 ms and the scan term Ts is set at 4 ms which is shorter than the 10 ms of the holding time 28 (FIG. 6) taken for the transmittance to start to lower from the maximum transmittance Ym.

A frame term Tf corresponds to a single write term, which consists of a reset term Tr and a scan term Ts. In FIG. 8, a first frame at the left-hand end is in a fully opened state, the second frame adjacent on the right-hand side is in a half-opened state and the third frame which follows is in a closed state, with the first to third frames appearing thereafter in the same order.

In the reset term Tr at room temperature, to render all pixels of the liquid crystal shutter closed, positive and negative 20V, 0.5 ms-long pulse waveforms are applied as reset signals in pairs to all the pixels. Data signals applied in the scan term Ts are set at 0V throughout the scan term Ts in the case of making the liquid crystal shutter fully opened. When keeping it closed, they are fed in the form of 20V, 0.5 ms-long pulse waveform signals throughout the scan term Ts. In the case of rendering it half-opened to present halftones, they are set at 0V for 2 ms equal to half of the scan term Ts but fed in the form of 20V, 0.5 ms-long pulse waveform signals for the remaining 2 ms of the term.

In this driving method, the reset signals and data signals are issued in the form of 0.5 ms pulse waveforms having positive and negative polarities so as to suppress long-term DC voltage application to the liquid crystal device. After the return of all the pixels of the liquid crystal shutter to their respective closed states in the reset term Tr, a period of time during which 0V data signals are issued can be varied in the scan term Ts so that only a predetermined pixel is opened or closed and an arbitrary gradation display is obtained.

The scan term Ts at room temperature is set at 4 ms, which is longer than the 2 ms of the off-response time taken to reach the maximum transmittance Ym from the closed state and shorter than the 10 ms of the holding time taken for the transmittance to return to the initial transmittance Y0 from the maximum transmittance Ym, so that it is possible to obtain a gradation display subjected to less variation in color and having a good linearity.

A reduction in the temperature, however, results in an increased response time of the liquid crystal device. Since in particular the off-response time from the closed state to the opened state increases, the brightness in the opened state is reduced, so that no opened state is exhibited at a further lowered temperature.

In this embodiment of the driving method, therefore, a temperature sensor is provided which, when the temperature goes down to 5° C. or below, automatically doubles the reset time Tr and the scan time Ts.

Regarding the response time at 0° C. of the liquid crystal shutter in accordance with the present invention, as is apparent from the transmittance-time curve 37 at 0° C. shown in FIG. 9, the on-response time from open to close is 1.5 ms and the off-response time from close to open is 4 ms, which are approximately twice as much as the respective response times at room temperature.

At 0° C., the holding time also approximately doubles, namely, increases to 20 ms. As seen from the waveform 36 of FIG. 9, the drive waveform at 0° C. has a 2 ms reset term Tr and an 8 ms scan term Ts, which are twice as much as the respective terms at room temperature, thereby ensuring a satisfactory opened state.

In the case where this liquid crystal shutter driving method is applied to a liquid crystal printer, a high-quality full color image print can be obtained both at room temperature and 0° C. although the print speed at a low temperature is reduced to half of the print speed at room temperature.

Although in this driving method, the frame term Tf consisting of the reset term Tr and the scan term Ts has been increased twice as much without varying the pulse length even at a low temperature, the pulse length may be simultaneously doubled to obtain exactly the same effect.

In the case of not needing the halftone display, the frame term Tf may be composed of only the scan term Ts without the reset term Tr, instead of composing the frame term Tf of both the reset term Tr and the scan term Ts.

Although in the above driving method, such description has been made that the gradation control is carried out by varying the period of time during which a 0V scan signal is issued in the scan term Ts, the gradation control may be performed by changing the voltage applied in the scan term Ts from 0V to thereby increase the off-response time.

INDUSTRIAL APPLICABILITY

As is apparent from the above description, the liquid crystal shutter in accordance with the present invention and the execution of the method of driving the liquid crystal shutter ensures a realization of a rapid response of the liquid crystal shutter and a bright, high contrast, while allowing a gradation display.

Stabilized shutter characteristics can also be maintained even though the liquid crystal shutter is operated at a wide-ranging operating temperature from a low temperature to a high temperature.

Thus, application of the present invention to the liquid crystal shutter of a color video liquid crystal printer and to the method of driving the same results in a constant acquisition of a high-quality full color image print.

The liquid crystal shutter and the method of driving the same in accordance with the present invention are applicable otherwise to, e.g., a field sequential color display, which is a combination of light emitting diodes (LEDs) and the liquid crystal shutter.

What is claimed is:

1. A liquid crystal shutter comprising:

A liquid crystal device including a nematic liquid crystal sealed in between a first transparent substrate and a second transparent substrate on whose inner surfaces are formed respective transparent electrodes, said liquid crystal device having a twisted angle of greater than 180° and less than or equal to 260°; and a pair of polarizing plates between which are sandwiched said first transparent substrate and said second transparent substrate, said polarizing plates having respective absorption axes which are orthogonal to each other, said absorption axes of said polarizing plates being angled with a range of ±40° to ±50° relative to a direction in which intermediate liquid crystal molecules are orientated, said direction indicating a direction of orientation of said liquid crystal in an intermediate portion in a direction of thickness of said liquid crystal device;

wherein said liquid crystal device performs white display utilizing birefringence of said liquid crystal when voltage is not applied thereto, and performs black display when driven by applying DC or AC voltage of 10 to 20V, and birefringence of said liquid crystal device is nullified when said voltage is applied to said liquid crystal device.

2. A liquid crystal shutter according to claim 1, wherein $\Delta$ nd lies within a range of 600 to 900 nm, said $\Delta$ nd being the product of a birefringence $\Delta$ n of said nematic liquid crystal and a gap d between said first transparent substrate and said second transparent substrate.

* * * * *